(12) United States Patent
Cantine et al.

(10) Patent No.: US 9,688,405 B2
(45) Date of Patent: Jun. 27, 2017

(54) LIGHTWEIGHT WEAPONS PLATFORM

(71) Applicant: Cantine Armament, Inc., Smyrna, TN (US)

(72) Inventors: Christopher Cantine, Hendersonville, TN (US); John Croghan, Nashville, TN (US); Andrew Scott, Smyrna, TN (US)

(73) Assignee: Cantine Armament, Inc., Smyrna, TN (US)

( * ) Notice: Subject to any disclaimer, the term of this patent is extended or adjusted under 35 U.S.C. 154(b) by 246 days.

(21) Appl. No.: 13/782,621

(22) Filed: Mar. 1, 2013

(65) Prior Publication Data

US 2013/0228650 A1 Sep. 5, 2013

Related U.S. Application Data

(60) Provisional application No. 61/606,022, filed on Mar. 2, 2012.

(51) Int. Cl.
*B64D 7/00* (2006.01)
*B64D 9/00* (2006.01)
*F41A 23/00* (2006.01)

(52) U.S. Cl.
CPC ............... *B64D 7/00* (2013.01); *B64D 9/00* (2013.01); *F41A 23/00* (2013.01)

(58) Field of Classification Search
CPC .... B64D 7/00; B64D 7/02; B64D 9/00; F41A 23/00
See application file for complete search history.

(56) References Cited

U.S. PATENT DOCUMENTS

| 4,893,545 | A  | * | 1/1990 | Sanderson et al. | .......... | 89/37.19 |
| 5,490,703 | A  | * | 2/1996 | Hewko | .......... | 296/19 |
| 6,241,185 | B1 | * | 6/2001 | Sanderson | .......... | 244/118.1 |
| 2010/0206992 | A1 | * | 8/2010 | Woodland et al. | .......... | 244/137.1 |

OTHER PUBLICATIONS

International Preliminary Report on Patentability for International Application No. PCT/US2013/02866 mailed from the International Searching Authority on Sep. 12, 2014.
International Search Report and Written Opinion for International Application No. PCT/US2013/028666, mailed Nov. 13, 2013.

* cited by examiner

*Primary Examiner* — Nicholas McFall
(74) *Attorney, Agent, or Firm* — Jeffrey T. Placker; Heath M. Sargeant; Holland & Knight LLP

(57) ABSTRACT

A mounting system is provided including a center platform having a plurality of mounting lugs for mounting the center platform transversely extending at least partially through an aircraft cabin with a first end and second end of the center platform adjacent a respective first and second side opening of the aircraft cabin. A first support pylon may be removably coupleable to the first end of the center platform to extend outwardly from a first side of the aircraft. A second support pylon may be removably coupleable to the second end of the center platform to extend outwardly form a second side of the aircraft. A modular floor component may be removably coupleable relative to a longitudinal side of the center platform to provide a substantially planar load surface including a top portion of the modular floor component and a top surface of the center platform.

21 Claims, 18 Drawing Sheets

LIGHTWEIGHT WEAPONS PLATFORM

CROSS-REFERENCE TO RELATED APPLICATION

This application claims the benefit of U.S. provisional patent application Ser. No. 61/606,022, filed on 2 Mar. 2012, entitled "Weapons Platform," the entire disclosure of which is incorporated herein by reference.

FIELD OF THE DISCLOSURE

The present disclosure relates to aircraft load carrying systems, and more particularly relates to configurable load carrying platform systems for aircraft.

BACKGROUND

It is often desirable to attach various external features, such as weapons components, sensor suites, fuel cells, and the like to the exterior of aircraft. For example, carrying such loads on the exterior of the aircraft may facilitate the use of features such as weapons components and sensor suites. Carrying such loads on the exterior of the aircraft may also facilitate attachment to the aircraft, rather than stowing the loads in the interior. Further, carrying such loads on the exterior of the aircraft may allow cargo space within the aircraft to be utilized for other purposes. Many different designs for attaching external features to an aircraft require permanent modification of the aircraft. Such modifications may be costly and add additional weight to the aircraft which may compromise performance. Further, permanently mounting structures extending from within the aircraft may compromise cargo space, and future cargo capacity, even when external features are not being carried by the aircraft.

SUMMARY

In an implementation, a mounting system may include a center platform including a plurality of mounting lugs for mounting the center platform transversely extending at least partially through an aircraft cabin with a first end of the center platform adjacent a first side opening of the aircraft cabin, and a second end of the center platform adjacent a second side opening of the aircraft cabin. A first support pylon may be removably coupleable to the first end of the center platform to extend outwardly from a first side of the aircraft. A second support pylon may be removably coupleable to the second end of the center platform to extend outwardly from a second side of the aircraft. A modular floor component may be removably coupleable relative to a longitudinal side of the center platform to provide a generally planar load surface including a top portion of the modular floor component and a top surface of the center platform.

One or more of the following features may be included. The modular floor component may be removably coupleable relative to the longitudinal side of the center platform to provide a load surface extending along a longitudinal axis of the aircraft. The mounting system may also include at least one cargo track disposed on the center platform, and at least one cargo track disposed on the modular floor component. The at least one cargo track disposed on the center platform and the at least one cargo track disposed on the module floor component may be longitudinally aligned when the modular floor component is removably coupled relative to the longitudinal side of the center platform to provide a generally continuous cargo track extending along at least a portion of the load surface. The mounting system may also include a cargo cradle slidably movable along the generally continuous cargo track for slidably positioning the load cradle relative to the load surface.

The first end of the center platform and the second end of the center platform may be disposed within the aircraft cabin. The first end of the center platform may extend at least partially through the first side opening of the aircraft cabin, and the second end of the center platform may extend at least partially through the second side opening of the aircraft cabin.

The mounting system may further include an inter-crew communication system port associated with one of the first support pylon and the second support pylon. The inter-crew communication system port may be coupled to an aircraft inter-crew communication system for coupling an external communication device with the aircraft inter-crew communication system. The mounting system may further include a data port associated with one of the first support pylon and the second support pylon. The data port may be coupled to an aircraft electronics system for coupling an external computing device with the aircraft electronics system.

Each of the first support pylon and the second support pylon may include a payload mount. The payload mount may include an ejector rack. The center platform, the first support pylon, and the second support pylon may each include formed metal structures.

According to another implementation, a mounting system may include a center platform including a plurality of mounting lugs for mounting the center platform transversely extending at least partially through an aircraft cabin with a first end of the center platform adjacent a first side opening of the aircraft cabin, and a second end of the center platform adjacent a second side opening of the aircraft cabin. A first support pylon may be removably coupleable to the first end of the center platform to extend outwardly from a first side of the aircraft. A second support pylon may be removably coupleable to the second end of the center platform to extend outwardly form a second side of the aircraft. An inter-crew communication system port may be associated with one of the first support pylon and the second support pylon. The inter-crew communication system port may be coupled to an aircraft inter-crew communication system for coupling an external communication device with the aircraft inter-crew communication system. A data port may be associated with one of the first support pylon and the second support pylon. The data port may be coupled to an aircraft electronics system for coupling an external computing device with the aircraft electronics system.

One or more of the following features may be included. The mounting system may further include a modular floor component removably coupleable relative to a longitudinal side of the center platform to provide a generally planar load surface including a top portion of the modular floor component and a top surface of the center platform. The modular floor component may be removably coupleable relative to the longitudinal side of the center platform to provide a load surface extending along a longitudinal axis of the aircraft. The mounting system may further include at least one cargo track disposed on the center platform, and at least one cargo track disposed on the modular floor component. The at least one cargo track disposed on the center platform and the at least one cargo track disposed on the module floor component may be longitudinally aligned when the modular floor component is removably coupled relative to the longitudinal side of the center platform to provide a generally continuous cargo track extending along at least a portion of the load surface. The mounting system may further include a cargo cradle slidably movable along the generally continuous cargo track for slidably positioning the load cradle relative to the load surface.

The first end of the center platform and the second end of the center platform may be disposed within the aircraft cabin. The first end of the center platform may extend at least partially through the first side opening of the aircraft cabin, and the second end of the center platform may extend at least partially through the second side opening of the aircraft cabin.

Each of the first support pylon and the second support pylon may include a payload mount. The payload mount may include an ejector rack. The center platform, the first support pylon, and the second support pylon may each include formed metal structures.

The details of one or more implementations are set forth in the accompanying drawings and the description below. Other features and advantages will become apparent from the description, the drawings, and the claims.

DETAILED DESCRIPTION OF ILLUSTRATIVE EMBODIMENTS

In general a mounting system consistent with the present disclosure may generally provide a relatively lightweight weapons platform, for example, the platform may be utilized for mounting weapons, ordnance, or other payloads on an aircraft, such as a helicopter or a fixed wing aircraft. In an illustrative embodiment, the mounting system may generally include a center platform that may be secured, either removably or permanently, to the aircraft in a manner generally extending transversely across a cabin of the aircraft (e.g., as between two opposed side doors which may permit access to the aircraft cabin). Two external pylons may be removably attached to the center platform, to provide projections from either side of the aircraft. The two pylons may allow for the attachment of external stores (such as weapons, ordnance, fuel cells, sensor suites, etc.). Further, in some embodiments, the pylons may be configurable, for example, including various sections that may be attached to one another to vary the length of the pylons, and/or to include various mounting features for attaching different external stores to the aircraft.

In some embodiments, the mounting system may also include a modular cargo floor. The modular cargo floor may include one, or more than one, modular floor components that may be attached relative to the center platform to provide a load surface. For example, in some embodiments the one or more modular floor components may be removably attached to the aircraft to provide a generally planar load surface including the modular floor component(s) and the center platform. In some embodiments, one or more modular floor components may be removably attached directly to the center platform. For example, a modular floor component may be attached to a longitudinal side of the center platform (e.g., which may generally extend transversely across the aircraft cabin). In such a configuration, the load surface including the center platform and the modular floor component may generally extend along at least a portion of the aircraft cabin in the fore-aft longitudinal axis of the aircraft. In some embodiments, the modular floor component and/or the center platform may include various attachment points, such as logistic tracks, cargo rings, studs, or the like, to which internal cargo components (e.g., auxiliary fuel cells, weapon mounts, ammunition magazines, and the like) may be secured. Various additional and/or alternative features may be included.

Figure 1:
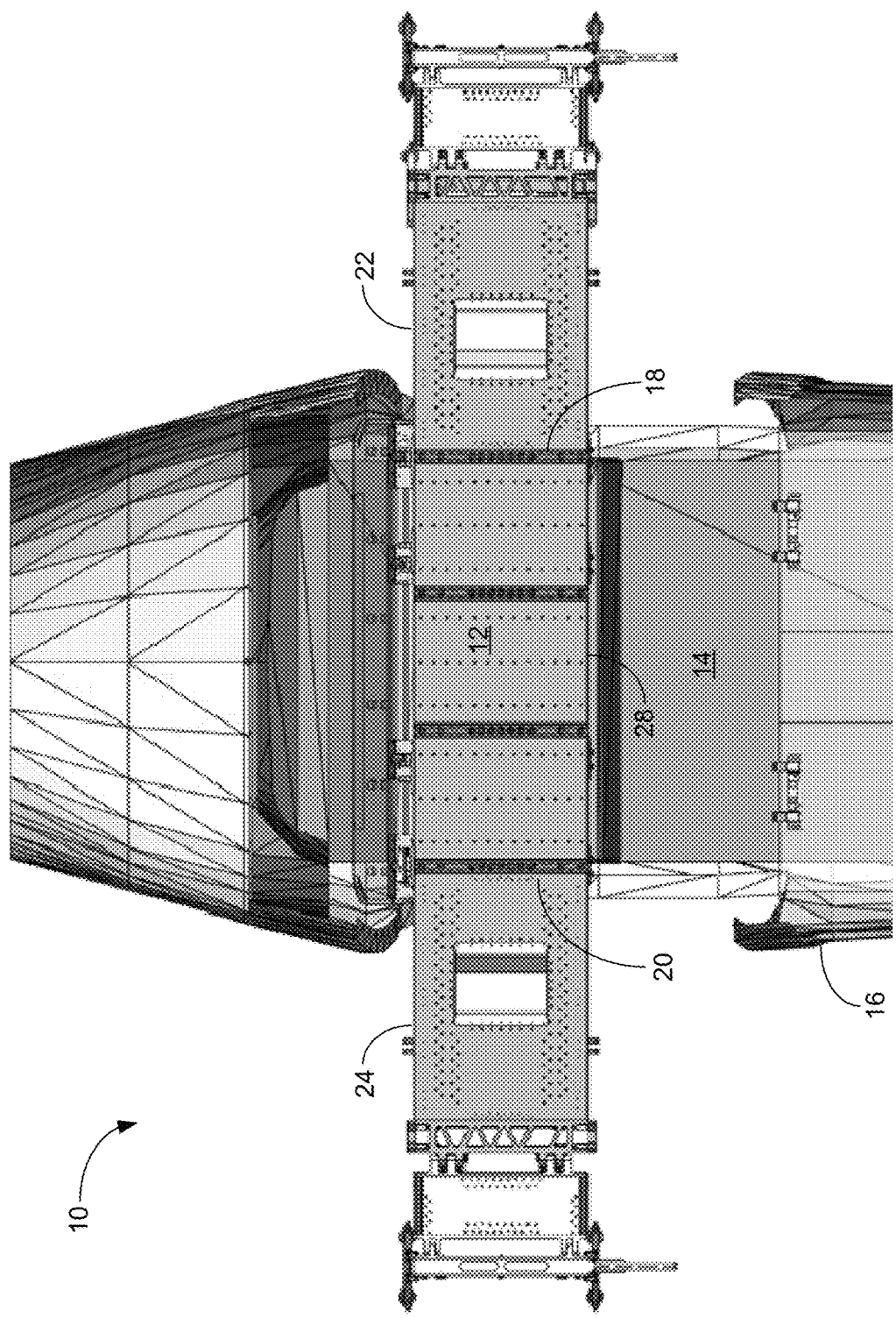
FIG. 1 schematically depicts an example mounting system, according to an embodiment of the present disclosure.

For example, and referring to FIG. 1, an example embodiment of a mounting system (e.g., mounting system 10) is shown. As depicted, mounting system 10 may generally include center platform 12 that may include a plurality of mounting lugs for mounting center platform 12 generally transversely extending at least partially through a cabin (e.g., aircraft cabin 14) of an aircraft (e.g., aircraft 16). As generally discussed above, aircraft 16 may include, for example, a helicopter or a fixed wing aircraft. In such a generally transverse configuration, a first end (e.g., first end 18) of center platform 12 may be adjacent a first side opening of aircraft cabin 14, and a second end (e.g., second end 20) may be generally adjacent a second side opening of aircraft cabin 14. In an embodiment, the first and second side openings of aircraft cabin 14 may include, for example, side doors or windows of aircraft 16, which may, for example, allow access to aircraft cabin. A first support pylon (e.g., first pylon 22) may be removably coupleable to first end 18 of center platform 12 to extend outwardly from a first side of aircraft 16. A second support pylon (e.g., second pylon 24) may be removably coupleable to second end 20 center platform 12 to extend outwardly from a second side of aircraft 16.

Figure 2:
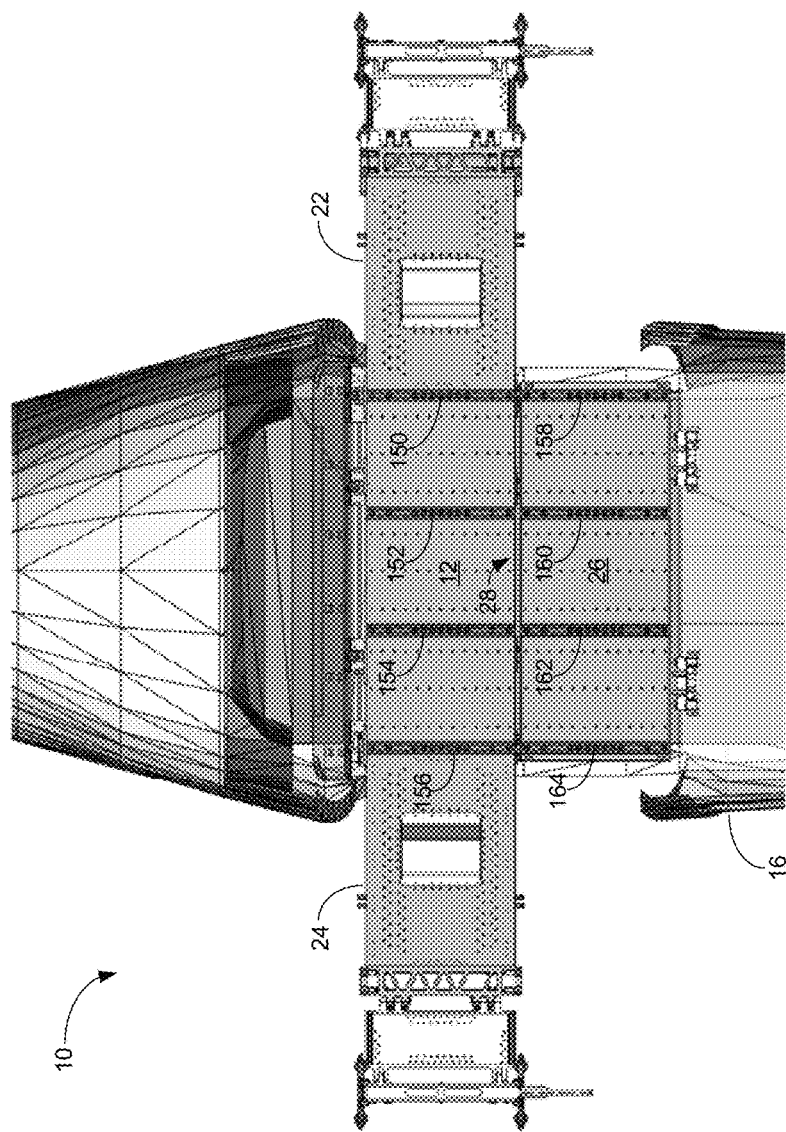
FIG. 2 schematically depicts another example mounting system, according to an embodiment of the present disclosure.

Referring also to FIG. 2, in an embodiment mounting system 10 may also include one, or more than one, modular floor components (e.g., modular floor component 26) mounted within aircraft cabin 14. While only a single modular floor component is shown in FIG. 2, in some embodiments, mounting system 10 may include more than one modular floor component mounted within aircraft cabin 14. Modular floor component may be removably coupleable relative to a longitudinal side (e.g., longitudinal side 28) of center platform 12. When modular floor component 26 is removably coupled relative to longitudinal side 28 of center platform 12, modular floor component 26 and center platform 12 may provide a generally planar load surface including a top portion of modular floor component 26 and a top surface of center platform 12.

Figure 3:
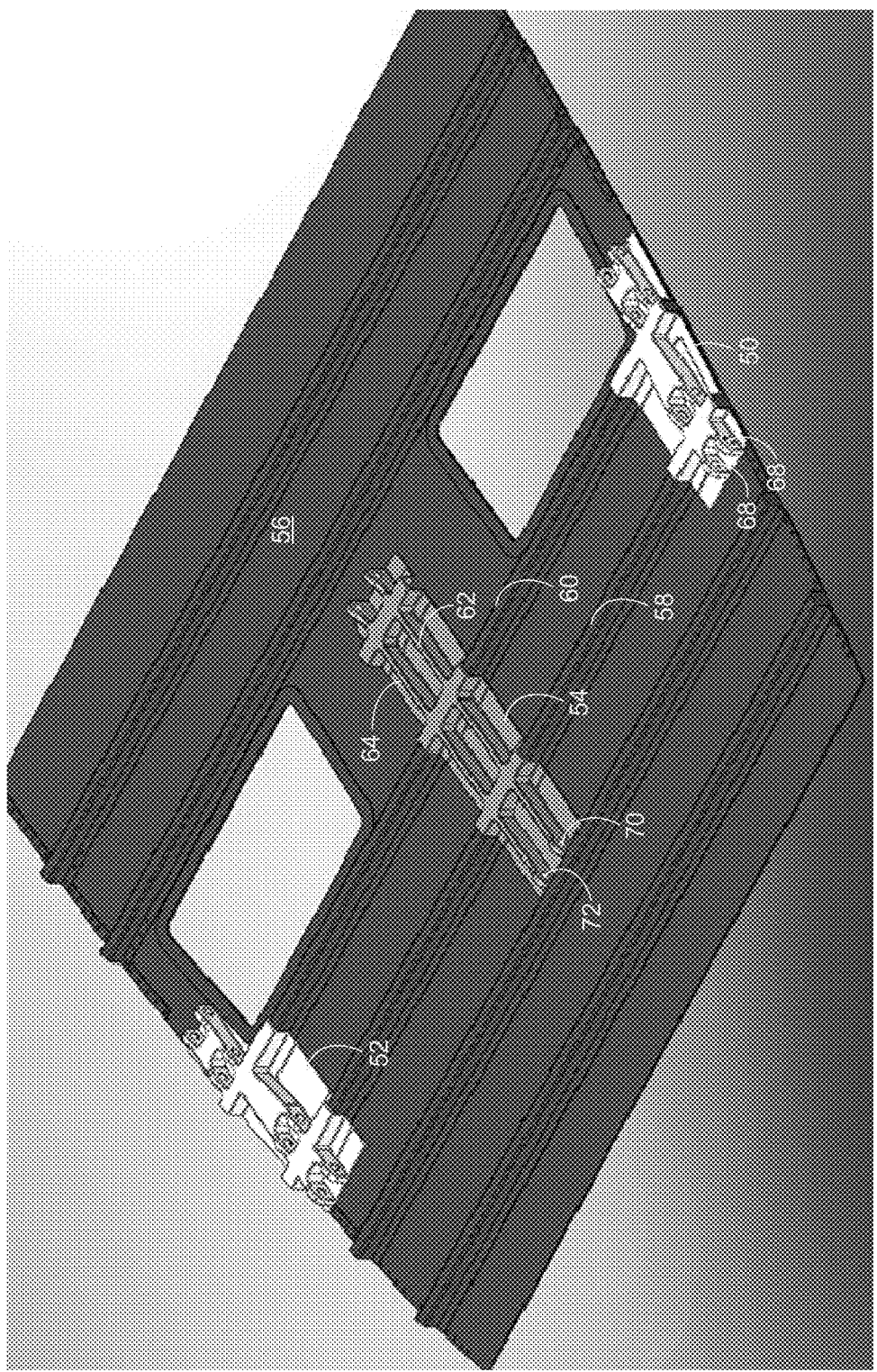
FIG. 3 depicts an example aircraft mounting arrangement that may be used with a mounting system, according to an embodiment of the present disclosure.

As generally described above, the center platform may include a plurality of mounting lugs for mounting the center platform transversely extending at least partially through an aircraft cabin. In an embodiment, the plurality of mounting lugs may allow the center platform to be removably mounted in the aircraft cabin, for example, to allow for relatively easy installation and removal of the mounting system from the aircraft. Referring also to FIG. 3, an embodiment of an aircraft mounting arrangement that may be utilized in connection with an embodiment of the mounting system of the present disclosure is generally shown. In the illustrative embodiment, the aircraft mounting arrangement may include a plurality of mounting features (e.g., outboard mounts 50, 52 and inboard mount 54) that may be attached to a cabin floor (e.g., cabin floor 56) of an aircraft cabin. In an embodiment, outboard mounts 50, 52 may be generally disposed adjacent respective sides of the aircraft (e.g., adjacent the first and second side openings of the aircraft cabin. Further, inboard mount 54 may be generally disposed in a mid-portion of the aircraft cabin, for example, generally between the two sides of the aircraft.

In the illustrated embodiment, cabin floor 56 may include a plurality of ribs (e.g., including ribs 58, 60) that may extend across the aircraft cabin floor generally transversely to the fore-aft axis of the aircraft (although other configurations are contemplated). In such an embodiment, each of mounts 50, 52, 54 may be shaped to be disposed over ribs 58, 60. For example, mounts 50, 52, 54 may include complementary channels on the underside thereof that may allow mounts 50, 52, 54 to conform to cabin floor 56 and ribs 58, 60. In an embodiment, mounts 50, 52, 54 may include stiffening features (e.g., ribs 62, 64 shown on inboard mount 54 extending between cabin floor ribs 58, 60). It will be appreciated that outboard mounts 50, 52 may include similar features. In some embodiments, mounts 50, 52, 54 may be attached to cabin floor 56, e.g., by riveting, adhesive bonding, and/or welding, or through other suitable attachment configuration. Additionally, while not shown, one or more doublers, or reinforcing features, may be disposed beneath cabin floor 56 in the region of one or more of mounts 50, 52, 54. In some embodiments, mounts 50, 52, 54 may be affixed to cabin floor 56 and to the underlying doublers, or reinforcing features, as by being riveted through cabin floor 56 and the underlying doublers, or reinforcing features.

Figure 4:
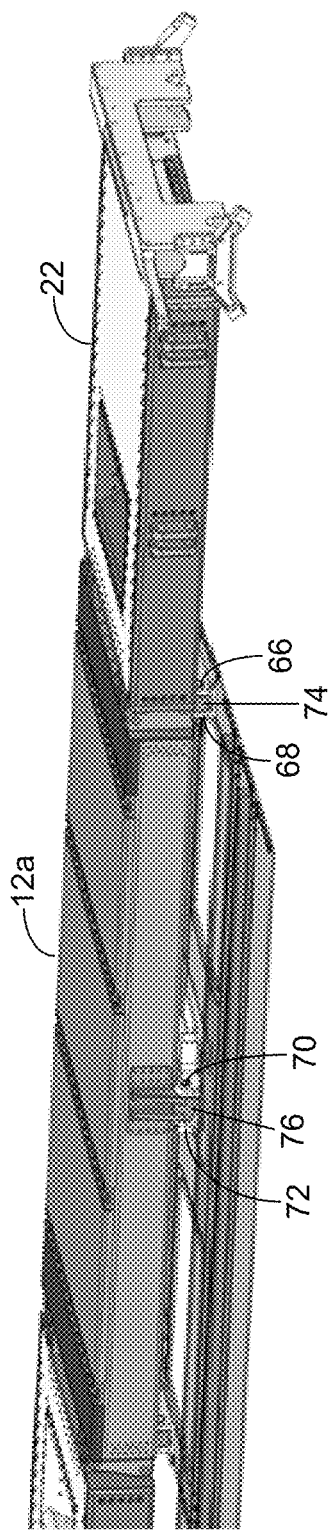
FIG. 4 depicts a mounting system coupled to an aircraft via the aircraft mounting arrangement of FIG. 3, according to an embodiment of the present disclosure.

As also shown, mounts 50, 52, 54 may include attachment brackets or features (e.g., attachment features 66, 68 shown included on outboard mount 50 and attachment features 70, 72 shown included on inboard mount 54). In some embodiments, attachment features 66, 68, 70, 72 may include brackets including through holes. With reference also to FIG. 4, center platform 12a may include a plurality of mounting lugs (e.g., mounting lugs 74, 76) that may cooperate with attachment features 66, 68, 70, 72 to allow removable attachment of center platform within aircraft cabin via mounts 50, 52, 54. For example, mounting lugs 74, 76 may include through holes that may cooperatively align with the through holes of attachment features 66, 68 and 70, 72, respectively. Consistent with such an embodiment, center platform 12a may be positioned above cabin floor 56 such that mounting lugs 74, 76 align with attachment features 66, 68, and 70, 72. Center platform 12a may be removably attached within the aircraft cabin, for example, using expansion pins, quick-release pins, or other suitable fasteners extending through the respective holes in attachment features 66, 68, 70, 72 and in mounting lugs 74, 76. It will be appreciated that while only attachment features 66, 68, 70, 72 and mounting lugs 74, 76 have been described additional attachment features and mounting lugs may be utilized. For example, as generally shown, outboard mounts 50, 52, and inboard mount 54 may each include two or more sets of attachment features, and center platform 12 may include corresponding mounting lugs. Further, while the forgoing arrangement has been described using expansion pins or other quick-release pins for coupling the mounting lugs and attachment features, it will be appreciated that other attachment configurations (e.g., including permanent attachment configurations) may equally be utilized.

Figure 5:
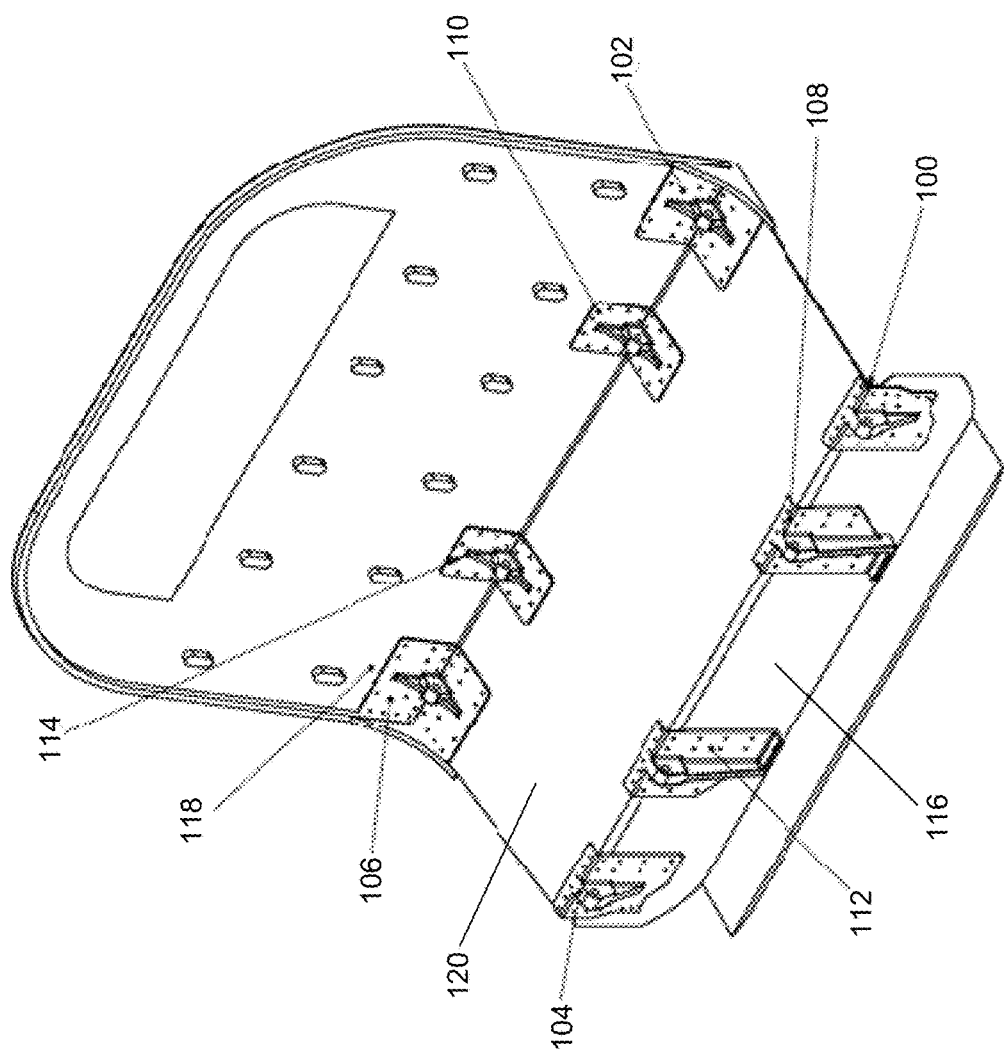
FIG. 5 depicts another example aircraft mounting arrangement that may be used with a mounting system, according to an embodiment of the present disclosure.
Figure 6:
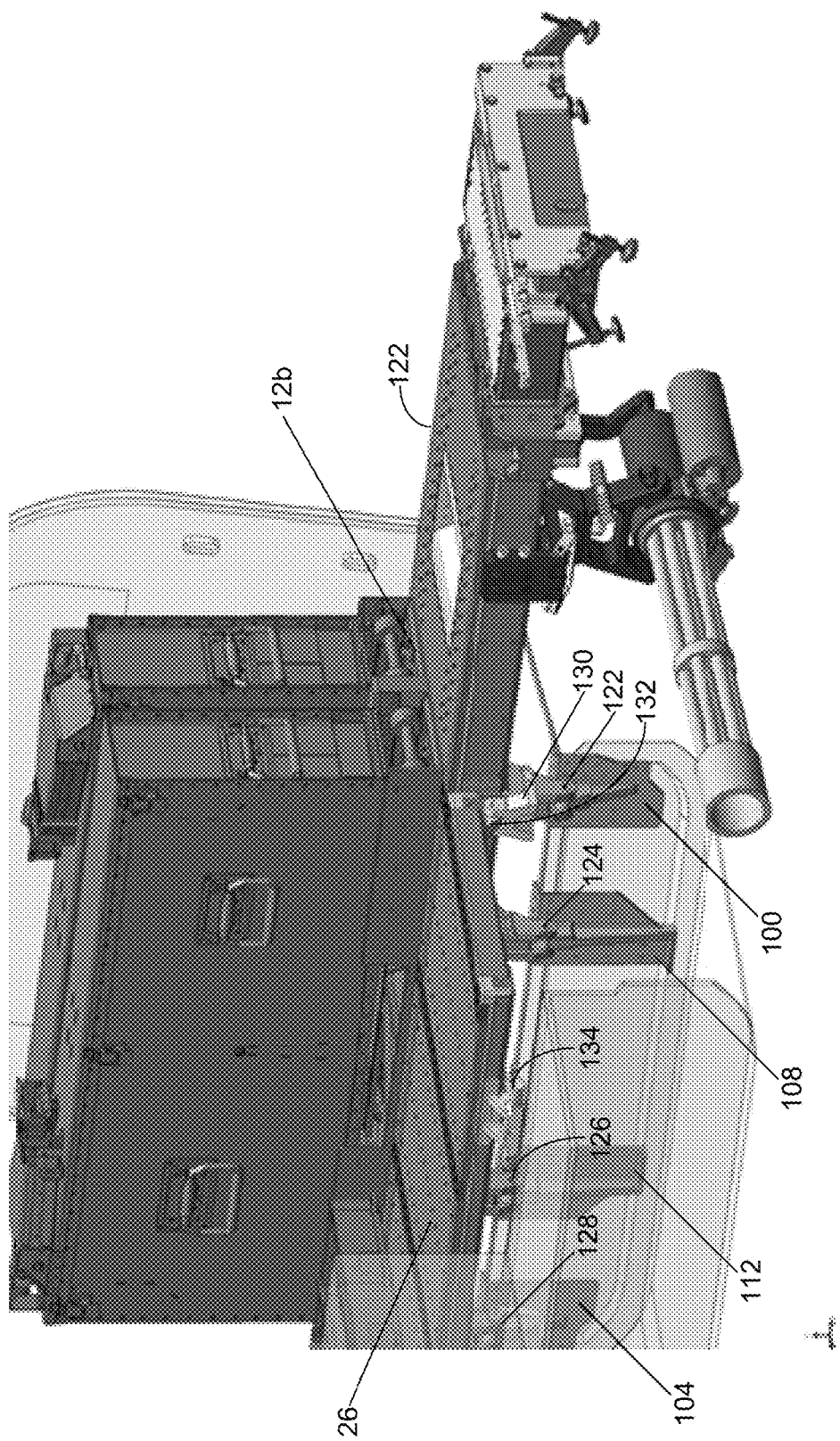
FIG. 6 depicts a mounting system coupled to an aircraft via the aircraft mounting arrangement of FIG. 5, according to an embodiment of the present disclosure.

Referring also to FIGS. 5 and 6, another illustrative configuration for removably attaching the center platform within the aircraft cabin is shown. In illustrated embodiment, a plurality of attachment brackets may be installed within the aircraft cabin. For example, two pairs of outboard attachment brackets (e.g., attachment brackets 100, 102 and attachment brackets 104, 106 adjacent a respective aircraft cabin side opening), and two pairs of inboard attachment brackets (e.g., attachment brackets 108, 110, 112, 114) may be installed within the aircraft cabin, for example with one attachment bracket of each pair attached to kick-panel 116 and seatback 118. As generally described in connection with the previous embodiment, the attachment brackets may be attached relative to the kick-panel and/or the seatback via any suitable attachment configuration, such as rivets, adhesive bonding, and/or welding to other suitable attachment configuration. Additionally, one or more of kick-panel 116, seatback 118 and seat-pan 120 may be reinforced, e.g., using a doubler or other reinforcing structure that may, for example, be installed behind kick-panel 116, seatback 118, and/or seat-pan 120. In some embodiments, the attachment brackets may be attached within the aircraft cabin through the respective kick-panel, seat-pan, and/or seatback, as well as through a respective doubler, or reinforcing structure.

With particular reference to FIG. 6, center platform 12b may be mounted within the aircraft cabin via the plurality of mounting brackets attached within the aircraft cabin, and a corresponding plurality of mounting lugs associated with center platform 12b. For example, as shown, center platform 12b may include mounting lugs 122, 124, 126, 128. Mounting lugs 122, 124, 126, 128 may cooperate with respective mounting brackets 100, 108, 112, 104 (e.g., by including cooperating through holes in the mounting lugs that may align with corresponding through holes in the mounting brackets) when center platform 12b is positioned within the aircraft cabin. Center platform 12b may be removably attached within the aircraft cabin using, for example, expansion pins or other quick-release pins that may couple the mounting lugs and attachment brackets. Other attachment configurations may similarly be utilized. Additionally, while only forward brackets 100, 104, 108, and 112 are shown, it will be appreciated that similar mounting configurations may be implemented with respect to aft mounting brackets 102, 106, 110, 114.

As shown, for example, in FIG. 2, and generally described above, mounting system may generally include a modular floor configuration, e.g., including modular floor component 26 that may be removably coupleable relative to longitudinal side 28 of center platform 12 to provide a generally planar load surface including a top portion of modular floor component 26 and a top surface of center platform 12. In some such configurations, the load surface may provide a relatively large, generally unobstructed cargo floor. In some embodiments, the load surface may not include typical obstructions found on the cabin floor of an aircraft. For example, modular floor component 26 and/or center platform 12 may be disposed above typical cargo floor obstructions found in aircraft cabins. The load surface may include various connection points (e.g., standard cargo attachment points) for securing cargo within the aircraft cabin. In some embodiments, modular floor component 26 may include a reinforced load carrying platform, e.g., which may include upper and lower formed metal surfaces attached to one or more stringers or reinforcing elements disposed between the upper and lower surfaces. Other configurations may equally be utilized (e.g., solid structural elements, upper surface attached to underside ribs, stringers, or frames, etc.).

The modular floor component may be removably coupleable relative to the longitudinal side of the center platform to provide a load surface extending along a longitudinal axis of the aircraft. That is, modular floor component 26 may generally be removably coupleable relative to longitudinal side 28 of center platform 12, that may extend generally transversely across the aircraft cabin. As such, modular floor component 26, together with center platform 12, may provide a load surface extending forward and/or aft of center platform 12, thereby providing the load surface extending along a fore-aft longitudinal axis of the aircraft.

According to various embodiments, the modular floor component may be removably coupleable relative to the center platform by being removably coupleable, at least in part, to the center platform. For example, and referring to FIG. 6, an example configuration is shown for removably coupling modular floor component 26 to center platform 12b. As shown, center platform 12b may include floor attachment lug 130 that may cooperatively engage modular floor lug 132. For example, floor attachment lug 130 may include a pair of spaced apart tabs having generally aligned through holes. Similarly, modular floor lug 132 may include a tab sized to be received between the pair of spaced apart tabs of floor attachment lug 130, and may include a through hole that may generally align with the through holes in the pair of spaced apart tabs when modular floor component 26 is positioned relative to center platform 12b. With the through holes in the floor attachment lug 130 and modular floor lug 132 aligned, modular floor component 26 may be removably coupled to center platform 12b via an expansion pin, quick-release pin, or other suitable attachment features inserted through the aligned holes. It will be appreciated that other attachment features may equally be utilized. In some embodiments, floor attachment lug 130 may be part of, and/or coupled to, one or more of the plurality of mounting lugs (e.g., mounting lug 122), may be part of, or coupled to, center platform 12b, and/or otherwise disposed. Additionally, while only one floor attachment lug and modular floor lug are shown, a plurality of floor attachment lugs and floor lugs may be utilized for removably coupling the modular floor component relative to the center platform. Further, the modular floor component may include one or more additional attachment features (e.g., attachment feature 134 disposed on a side of modular floor component 26 opposite from center platform 12b) for removably coupling other portions of the modular floor component within the aircraft cabin (e.g., to support and/or secure an opposed edge of the modular floor component). Various attachment features and arrangement as described herein, and/or as generally know, may be utilized.

In other embodiments, the modular floor component may be removably coupleable relative to the center platform by being removably coupleable to one or more mounting structures within the aircraft cabin. The modular floor component may be removably coupleable to the one or more mounting structures within the aircraft cabin such that, when the modular floor component is removably coupled within the aircraft cabin, the modular floor component may be positioned adjacent to the center platform to provide the generally planar load surface. Various mounting structures within the cabin and/or on the modular floor component may be utilized for removably coupling the modular floor component relative to the center platform. For example, one or more mounting structures similar to the mounting arrangements described for attaching the center platform within the aircraft cabin may be used for removably coupling the modular floor component within the aircraft cabin. Additional/alternative arrangements may equally be utilized.

The mounting system may also include at least one cargo track disposed on the center platform, and at least one cargo track disposed on the modular floor component. For example, in the embodiment shown in FIG. 2, center platform 12 may include four cargo tracks (e.g., cargo tracks 150, 152, 154, 156) extending generally parallel to the for-aft longitudinal axis of aircraft 16. Further, modular floor component 26 may include four cargo tracks (e.g., cargo tracks 158, 160, 162, 164) extending generally parallel to the fore-aft longitudinal axis of aircraft 16. The cargo track may include, for example, logistic track (L-Track) or other cargo track that may provide attachment points for securing aircraft cargo. Further, as is generally known, cargo accessories for use with cargo track may be slidable along the cargo track to provide for adjustable positioning of the attachment point. For example, a cargo track mount may be coupled with the cargo track and slidingly moved to a desired location. The cargo accessory may be secured in the desired location, e.g., as through the use of cam-lock features, expansion bolts, or the like.

In an embodiment, the at least one cargo track disposed on the center platform (e.g., cargo tracks 150, 152, 154, 156) and the at least one cargo track disposed on the module floor component (e.g., cargo tracks 158, 160, 162, 164) may be longitudinally aligned when the modular floor component (e.g., modular floor component 26) is removably coupled relative to the longitudinal side of the center platform (e.g., center platform 12) to provide a generally continuous cargo track extending along at least a portion of the load surface. For example, as shown, cargo track 150 may be longitudinally aligned with cargo track 158, cargo track 152 may be longitudinally aligned with cargo track 160, cargo track 154 may be longitudinally aligned with cargo track 162, and cargo track 156 may be longitudinally aligned with cargo track 164. Accordingly, in the illustrated embodiment, when modular floor component 26 is removably coupled relative to center platform 12, four generally continuous cargo tracks may be provided, each extending along at least a portion of the load floor provided by modular floor component 26 and center platform 12. The generally continuous tracks may allow cargo to be repositioned and/or relocated within the aircraft cabin, for example, by sliding the cargo along one or more of the generally continuous tracks. For example, cargo may be repositioned and/or relocated between a portion of the load surface including modular floor component 26 and a portion of the load surface including center platform 12 by sliding the cargo along the generally continuous track without decoupling the cargo from the track. In such an embodiment, for example, mission equipment, such as ammunition magazines, may be attached to the cargo track to thereby provide much more flexibility in mounting locations of the mission equipment.

Figure 7:
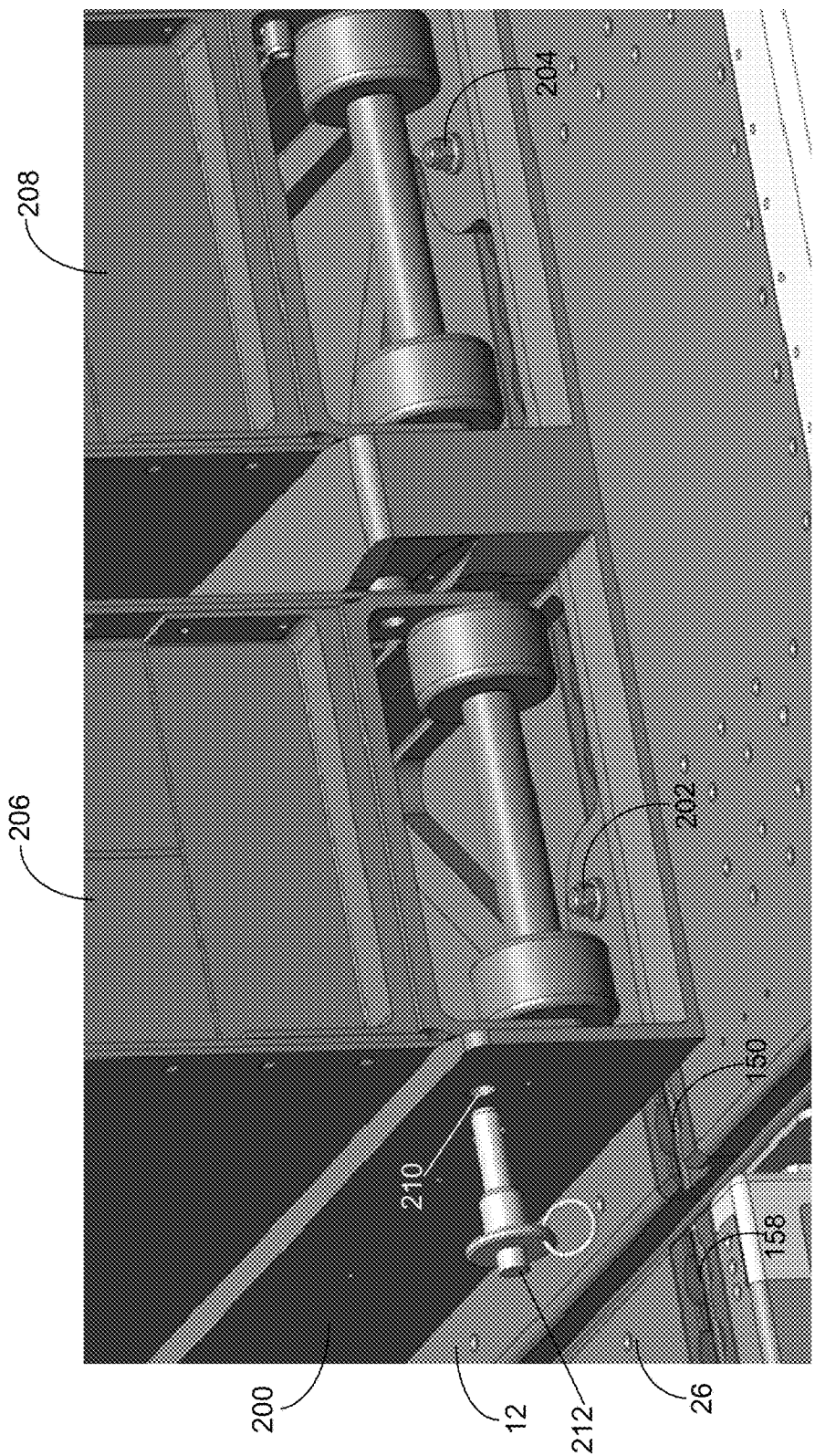
FIG. 7 depicts a cargo cradle, according to an embodiment of the present disclosure.

The mounting system may also include a cargo cradle slidably movable along the generally continuous cargo track for slidably positioning the load cradle relative to the load surface. For example, the cargo cradle may engage one or more cargo tracks (e.g., including generally continuous cargo tracks including longitudinally aligned cargo track features associated with the center platform and with the modular floor component). For example, and referring also to FIGS. 6 and 7, in an embodiment cargo cradle 200 may engage one or more cargo tracks (e.g., cargo tracks 150-164) for slidable positioning of cargo cradle 200 along the cargo tracks (including generally continuous cargo tracks including longitudinally aligned cargo tracks associated with the center portion and cargo tracks associated with the modular floor component). For example, cargo cradle 200 may be oriented generally transversely relative to the aircraft cabin and may include more than one parallel cargo track, e.g., for slidable positioning of cargo cradle 200 along the parallel tracks. In an embodiment in which cargo tracks associated with the center platform may be longitudinally aligned with cargo tracks associated with the modular floor component, cargo cradle 200 may be slidably positioned across the center platform and the modular floor component along the longitudinally aligned cargo tracks thereof.

In an embodiment, cargo cradle 200 may be releasably fastened in a desired position along one or more of cargo tracks 150-164, e.g., via standard cargo attachment provisions, such as double stud fittings 202, 204, and the like. In some embodiments, cam locks 202, 204 may include low profile components capable of securing cargo cradle, while providing minimal protrusion above the load surface. In some embodiments, cargo cradle 200 may include features for securing cargo relative to cargo cradle 200. For example, in the illustrated embodiment, cargo cradle 200 may be configured for positioning ammunition magazine 206, 208. Cargo cradle 200 and ammunition magazines 206, 208 may include cooperating features (e.g., hole 210 in cargo cradle 200 and a cooperating hole in ammunition magazine 206, not shown) that may allow ammunition magazines 206, 208 to be locked in position relative to cargo cradle 200, e.g., using quick-release ball pin 212, or other securement feature.

According to some embodiments, the cargo cradle may allow for relatively quick and easy relocation of ammunition magazines (or other cargo), for example, to adjust the center of gravity of the aircraft or to remedy ammunition feed issues. Additionally, in some embodiments, the cargo cradle may allow the same ammunition magazines and attachment hardware to be used in various locations within the aircraft (or in other aircraft), for example by moving the location of ammunition magazines to support weapon components attached to the support pylons (e.g., with the ammunition magazines generally positioned adjacent a side door or opening of the aircraft) or to support of a crew served window or door mounted gun system (e.g., with the ammunition magazines generally positioned forward of the side door or opening of the aircraft), or for transporting multiple ammunition magazines in support of field operations, or the like.

As generally discussed above, the mounting system may include a first support pylon (e.g., first pylon 22) that may be removably coupleable to a first end of the center platform (e.g., to first end 18 of center platform 12) to extend outwardly from a first side of the aircraft. The mounting system may also include a second support pylon (e.g., second pylon 24) that may be removably coupleable to the second end of the center platform (e.g., second end 20 of center platform 12) to extend outwardly form a second side of the aircraft. In general, first and second pylons 22, 24 may generally provide extensions from center platform 12, which may allow various external stores to be mounted to the aircraft (e.g., to be mounted to be carried on the exterior of the aircraft). For example, first and second pylons 22, 24 may be used to mount weapons, weapon components, ordnance, fuel cells, cargo (sensor suites, electronic warfare packages, etc.), to the exterior of the aircraft. According to various embodiments, the size, length, and features associated with one or both of the first and second pylons may vary, e.g., depending upon desired characteristics for the external stores to be mounted to the aircraft.

Figure 8:
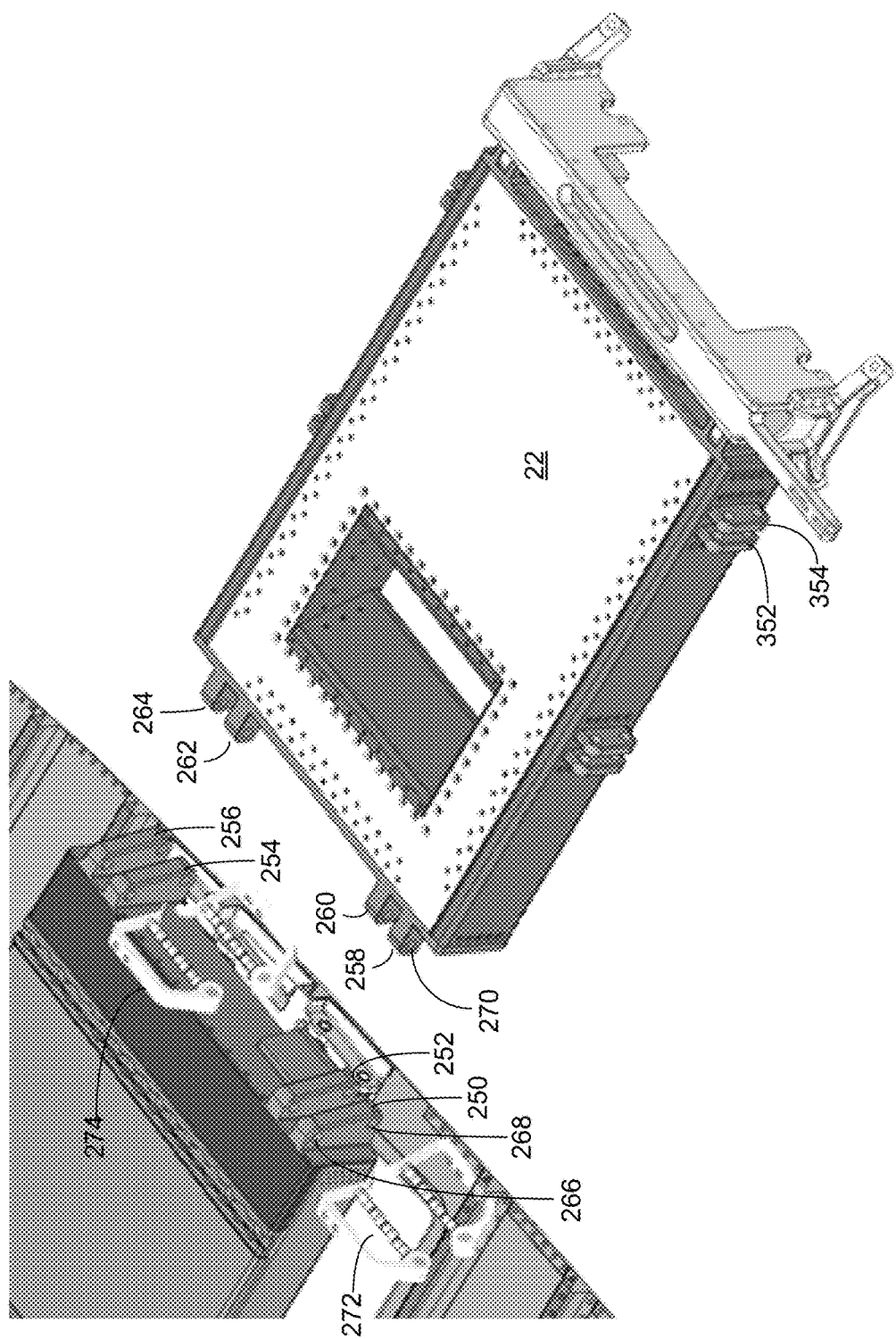
FIG. 8 depicts a removably coupleable support pylon of an example mounting system, according to an embodiment of the present disclosure.
Figure 9:
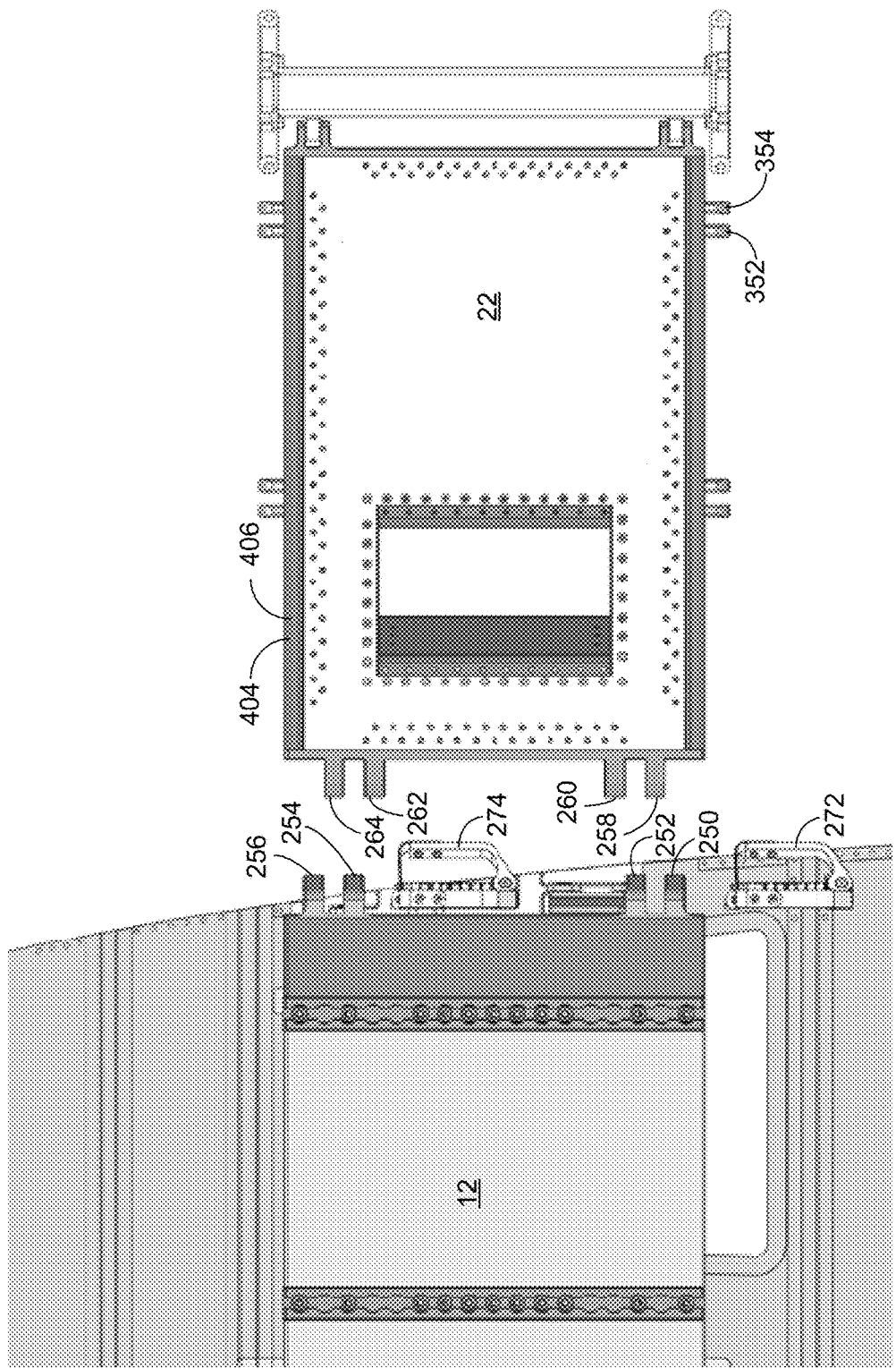
FIG. 9 depicts a removably coupleable support pylon of an example mounting system, according to an embodiment of the present disclosure.

The first and second pylons may be removably coupleable to the center platform, for example, to allow removal of the first and/or second pylon, to allow different pylon configurations to be implemented (e.g., by replacing a pylon having a first configuration with a pylon having a second configuration). Referring also to FIGS. 8 and 9, in an embodiment, first pylon 22 may be removably coupleable to center platform 12 via cooperating features, such as tabs (e.g., tabs 250, 252, 254, 256 associated with center platform 12 and tabs 258, 260, 262, 264 associated with first pylon 22). In the illustrated embodiment, each respective set of tabs associated with center platform 12 and first pylon 22 (e.g., tabs 250, 252, 258, 260 and tabs 254, 256, 262, 264) may include corresponding holes (e.g., holes 266, 268 on tab 250 and corresponding hole 270 and not-shown lower hole on tab 258) that may be aligned when first pylon 22 is positioned relative to center platform 12. First pylon 22 may be removably coupled to center platform 12 using suitable quick release fastener (e.g., quick release pin 272, expansion pins, or the like), or other suitable fastener (e.g., bolts, etc.) inserted through each set of corresponding holes in respective tabs of first pylon 22 and center platform 12. As such, first pylon 22 may be relatively quickly and easily coupled to and/or removed from center platform 12. It will be appreciated that while only certain features have been specifically identified (e.g., holes 266, 268, 270 associated with tabs 250, 270, respectively), corresponding features may be included elsewhere. Second pylon 24 may be similarly removably coupled with center platform 12.

In an embodiment, and as shown in FIG. 8, one or more sets of cooperating features associated with the center platform and the first pylon (e.g., tabs 250, 252, 254, 256 associated with center platform 12 and tabs 258, 260, 262, 264 associated with first pylon 22) may include pairs of vertically and/or horizontally spaced holes (e.g., vertically spaced holes 266, 268 of tab 250 and corresponding vertically spaced holes 270 and not-shown lower hole of tab 258). The vertically and/or horizontally spaced holes may allow the pylon to pivot relative to the center platform, for example, when only quick release pins associated with one set of holes (e.g., the upper holes) is installed. For example, upper quick release pins 272 and 274 may act as pivots, allowing first pylon 22 to pivot about the axis of quick release pins 272, 274 (e.g., allowing first pylon 22 to pivot upwardly). In an embodiment, tabs 250, 252, 254, 256, 258, 260, 262, 264 may be configured such that, for example, if only top quick release pins 272, 274 are installed, first pylon 22 may droop at least slightly (e.g., may attain a downward angle relative to center platform 12 and/or relative to a fully coupled configuration). The droop of first pylon 22 may, in some instances, provide a visual indication that the pylon is not fully coupled to the center platform.

Figure 10:
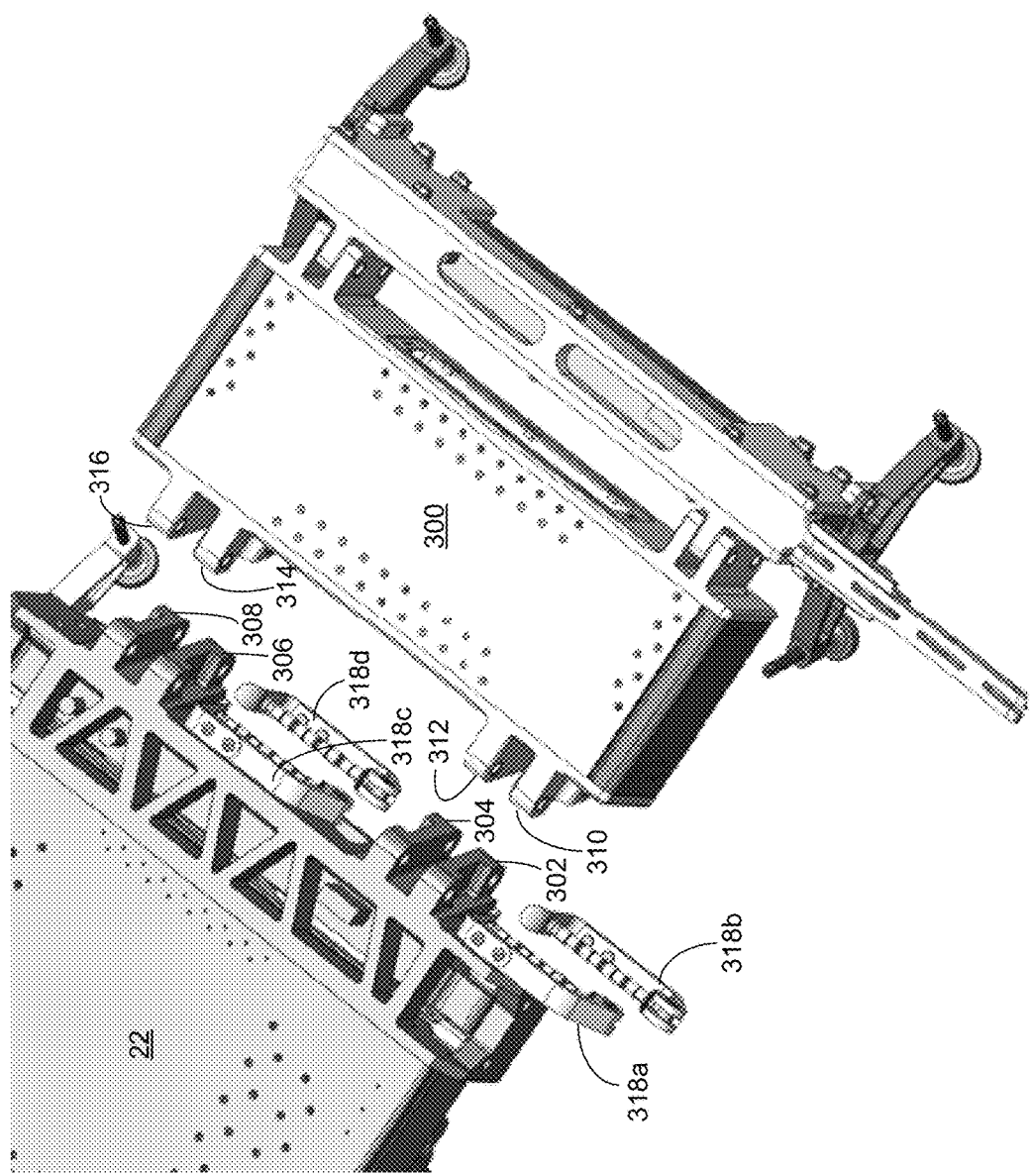
FIG. 10 depicts a payload mounting arrangement, according to an embodiment of the present disclosure.

In some embodiments, the first and/or second support pylons may be extendable, e.g., in terms of length, functionality, and/or included features. For example, the first and/or second pylons may be extendable by removably coupling additional pylon sections together. For example, as shown in FIG. 10, in an embodiment, and extension (e.g., pylon extension 300) may be removably coupled with first pylon 22, using similar cooperating features (e.g., tabs 302, 304, 306, 308 associated with first pylon 22 and tabs 310, 312, 314, 316 associated with pylon extension 300, respectively including coopering holes) and quick-release pins (e.g., quick release pins 318a-d, expansion pins, or other quick release attachment features) or other suitable attachment features, in a manner generally as discussed above with respect to removably coupling first pylon 22 with center platform 12.

One or more of the first support pylon and the second support pylon (and/or an extension pylon removably coupled to the first and/or second pylon) may include one or more payload mounts. The one or more payload mounts may, for example, allow external stores to be attached to a support pylon, to thereby to be mounted to the aircraft (e.g., to be mounted to be carried on the exterior of the aircraft). Examples of external stores may include, but are not limited to weapons, weapon components, ordnance, fuel cells, cargo (sensor suites, electronic warfare packages, etc.). In an embodiment, the one or more of the payload mounts may utilize an expansion pin system. An expansion pin system may, in some embodiments, make installation of an external store by a single person possible, may reduce the time required to install the external store, and/or may reduce the tolerance-mismatch between mating parts.

Figure 11:
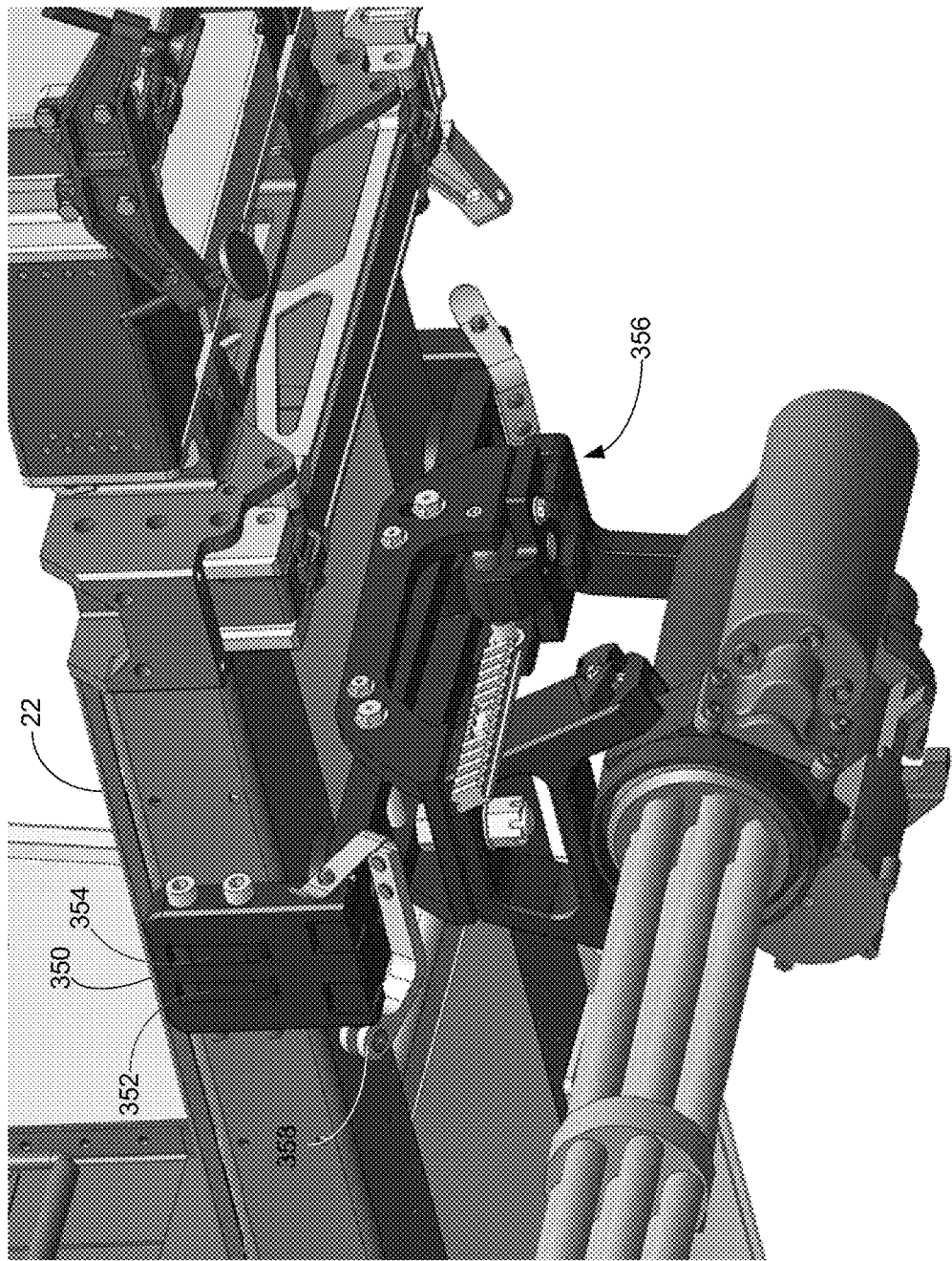
FIG. 11 depicts another payload mounting arrangement, according to an embodiment of the present disclosure.

For example, and referring also to FIG. 11, in an embodiment, a payload mount may include mounting blocks coupled to respective leading and trailing edges of first pylon 22 (e.g., mounting block 350 associated with the leading edge of first pylon 22). For example, mounting block 350 may be coupled to mounting tabs 352, 354 of first pylon 22 using suitable fastening features (e.g., bolts, quick release pins or the like). Further, mounting assembly 356 (e.g., which may carry the specific external store to be carried by first pylon 22, such as a weapon system in the illustrated embodiment) may be coupled to the mounting blocks (e.g., mounting block 350) via quick-release pin 358, which may, for example, couple mounting block 350 and mounting assembly 356 via cooperating holes that may be aligned when mounting assembly 356 is positioned relative to mounting block 350. The trailing edge of mounting assembly may be removably coupled with pylon 22 in a corresponding manner.

Figure 12:
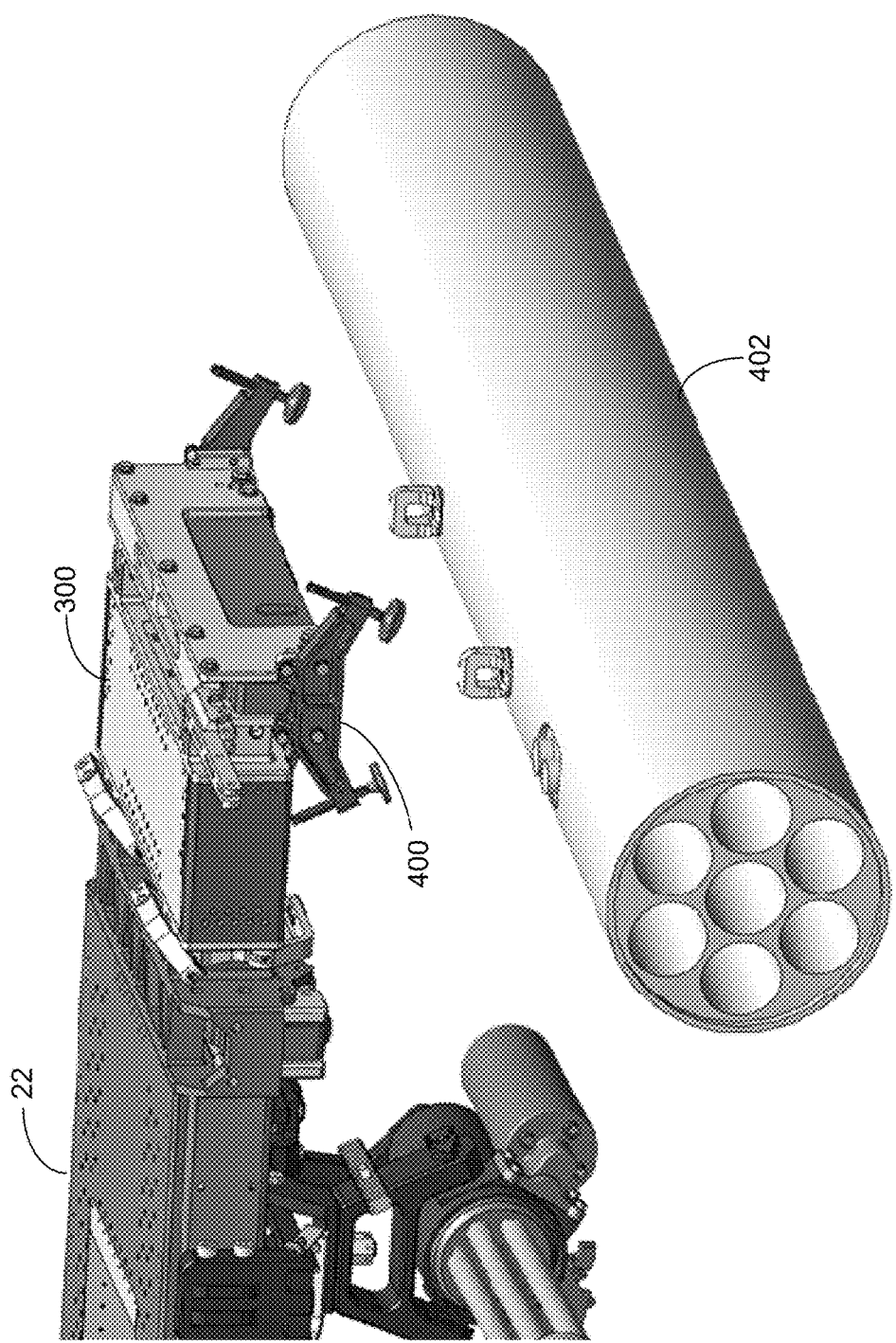
FIG. 12 depicts another payload mounting arrangement, according to an embodiment of the present disclosure.

In an embodiment, the payload mount may include an ejector rack. For example, as shown in FIG. 12, pylon extension 300 may generally include ejector rack 400. As is generally known, an ejector rack assembly may generally allow attachment of a number of different external stores (e.g., rocket pod 402 in the illustrated example), which may then be jettisoned during flight. In some embodiments, ejector rack 400 may include a NATO standard 14 inch ejector rack or other ejector rack and/or suspension rack. While ejector rack 400 is shown associated with pylon extension 300, in other embodiments, an ejector rack may be removably coupled with one or more of the first and second pylons.

The mounting system may further include an inter-crew communication system port associated with one of the first support pylon and the second support pylon (e.g., port 404, which may, for example, be located on an aft face of support pylon 22, as indicated in FIG. 9, or in any other suitably accessible location). The inter-crew communication system port may, for example, be coupled to an aircraft inter-crew communication system for coupling an external communication device with the aircraft inter-crew communication system. For example, one or more connectors may be at least partially disposed within the first or second pylon and may be coupled an inter-crew communication system connector within the aircraft. In some embodiments, the one or more connectors may additionally/alternatively be at least partially disposed within the center platform. In some embodiments, separate connectors may be at least partially disposed within the first and/or second pylons and within the center platform. When the first and/or second pylon are removably coupled with the center platform, the separate connectors within the first and/or second pylons may be connected with the separate connector within the center platform, which may in turn be connected to an inter-crew communication system connector within the aircraft. In an embodiment, the inter-crew communication system port located on the first and/or second pylon may provide the ground crew with the ability to easily communicate with the aircrew (for example, via the external communication device that may be connected to the inter-crew communication system via the port). Communication between the ground crew and the aircrew may improve ground crew safety and efficiency.

The mounting system may further include a data port associated (e.g., data port 406, which may, for example, be located on an aft face of support pylon 22, as indicated in FIG. 9, or in any other suitably accessible location) with one of the first support pylon and the second support pylon. It will be appreciate that while data port 406 is illustrated The data port may be coupled to an aircraft electronics system for coupling an external computing device with the aircraft electronics system. In a similar manner as described relative to the inter-crew communication system port, one or more connectors and/or separate connectors may be at least partially disposed within one or more of the first and second pylons and/or at least partially within the center platform, and may be ultimately connected with a data port connector within the aircraft. In some embodiments, data port connections at least partially disposed within the first and/or second pylons may be connected with data port connections at least partially disposed within the center platform when the first and/or second pylons are removably coupled with the center platform. Locating data ports on one or more of the support pylons may provide the ground crew with the ability to interface with aircraft electronic systems digitally, for example, using a laptop computer, tablet computing device, smartphone, custom computing device, or other suitable computing device. Interfacing with the aircraft electronic systems may allow the ground crew to update ammunition inventories, remotely perform system diagnostics, and record maintenance notes, and/or perform other functions relative to the aircraft electronics systems As generally shown, for example, in FIGS. 4 and 6, in some embodiments the center platform (e.g., one or more of center platform 12, 12a, 12b) may include a generally rectangular structure that may be configured to extend transversely across the aircraft cabin. In some embodiments, the center platform may include a generally rectangular cross-section. It will be recognized that other shapes and configurations may be implemented. Similarly, the first and second support pylons (for example, support pylon 22 as shown in FIGS. 6 and 8-12) may also include a generally rectangular structure that may be configured to extend outwardly from the center platform. In some embodiments, the first and/or second pylons may include a generally rectangular cross-section. Additionally, as shown, the pylons may include cut-out and/or other features that may provide functional aspects and/or increase the strength to weight ratio of the pylon. It will be recognized that other shapes and configurations may be implemented.

The center platform, the first support pylon, and the second support pylon may each include formed metal structures. In some embodiments, formed metal structures may provide favorable weight to strength properties. Additionally/alternatively, formed metal structures may provide a relatively high degree of durability, for example, being capable of being dented, cut, etc., without compromising overall structural integrity (e.g., may provide relatively high damage tolerance), and may be capable of being repaired.

Formed metal structures may include, for example, one or more formed sheet metal (e.g., aluminum sheet, steel sheet, or other suitable metal) components that may be joined together to provide the final product (e.g., center platform, pylon, etc.). The formed sheet metal components may be joined using any suitable joining techniques, including, but not limited to, riveting, adhesive bonding, welding, and/or combinations of joining techniques. Formed metal components may be joined to other formed metal components and/or may be joined to machined, cast, extruded, etc., metal components. For example, the cooperating features associated with the center platform and the first pylon (e.g., tabs 250, 252, 254, 256 associated with center platform 12 and tabs 258, 260, 262, 264 associated with first pylon 22) that may allow first pylon 22 to be removably coupled to center platform 12 may include machined and/or cast features to which formed metal components may be attached. Similarly, mounting tabs 352, 354 (and/or the entire edge or portion of the entire edge of pylon 22) may include a machined, cast, extruded, etc., component to which formed metal components may be joined. Further, formed metal components may be attached to other structural and/or reinforcing features, which may include machined, case, extruded, etc., components.

Figure 13:
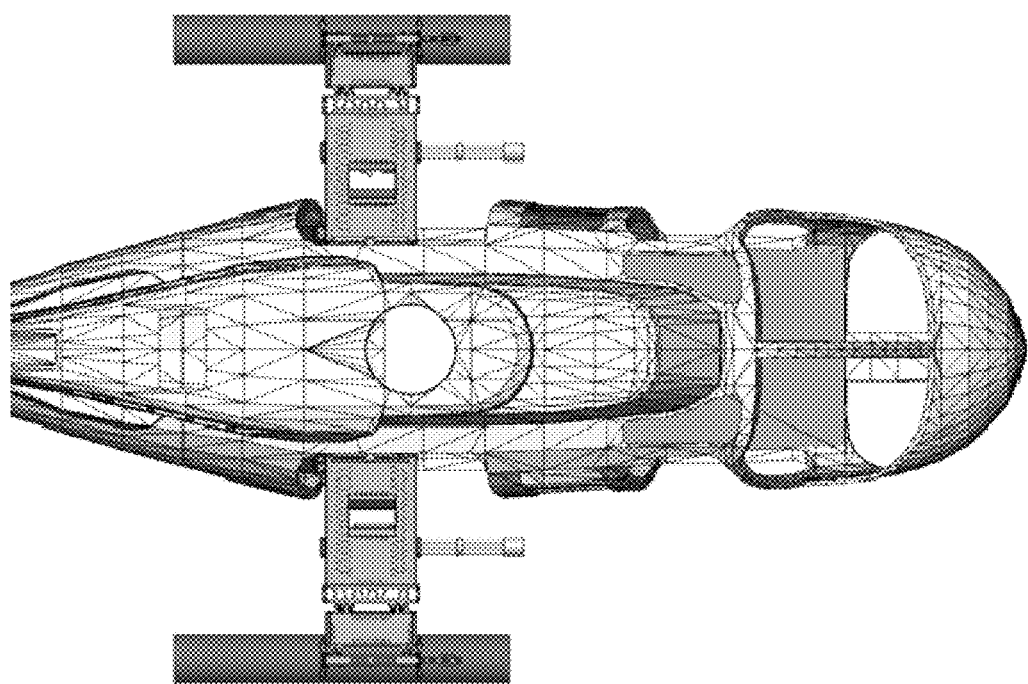
FIGS. 13-18 diagrammatically depict an aircraft including a mounting system configured in various illustrative load carrying configurations.

Referring to FIGS. 13-18, various example configurations of mounting systems are shown, including various pylon configurations and payload configurations. For example, FIG. 13 depicts an embodiment including respective first and second support pylon each having a gatling gun mounted thereto, and each having a pylon extension mounted there to, including an ejector rack mounting a rocket pod.

Figure 14:
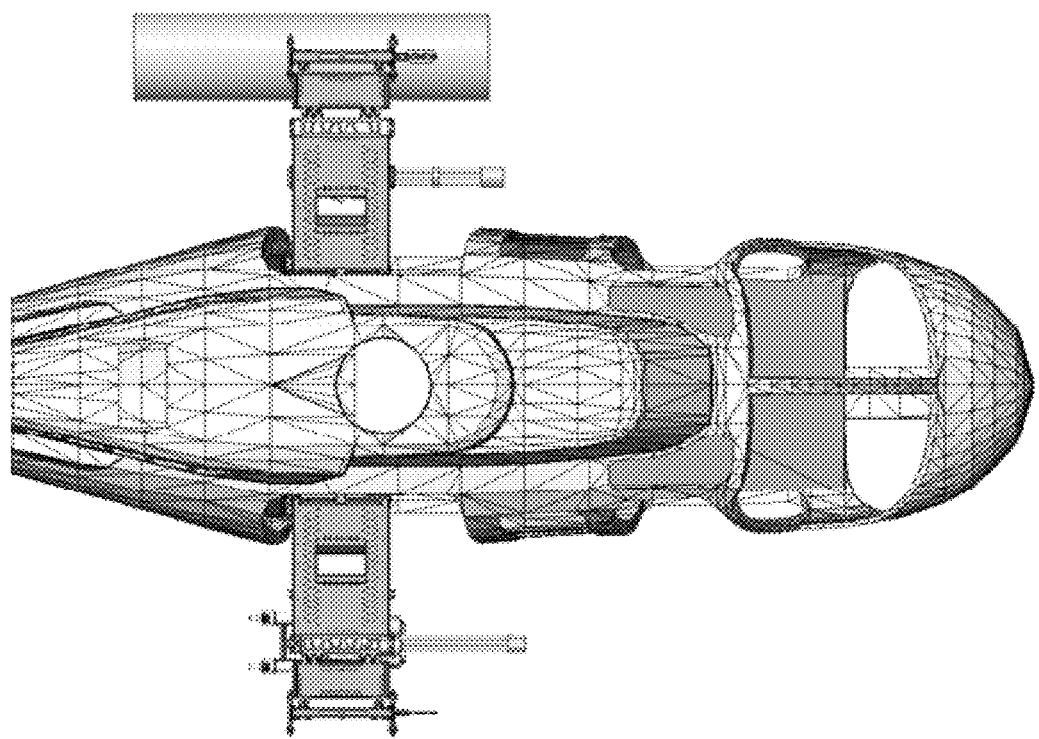

FIG. 14 depicts and embodiment including respective first and second support pylons having a gatling gun mounted thereto. Each support pylon additionally includes a pylon extension mounted to it, with each pylon extension including an ejector rack. In the depicted configuration, only the ejector rack mounted to one of the support pylons includes a rocket pod mounted to the ejector rack.

Figure 15:
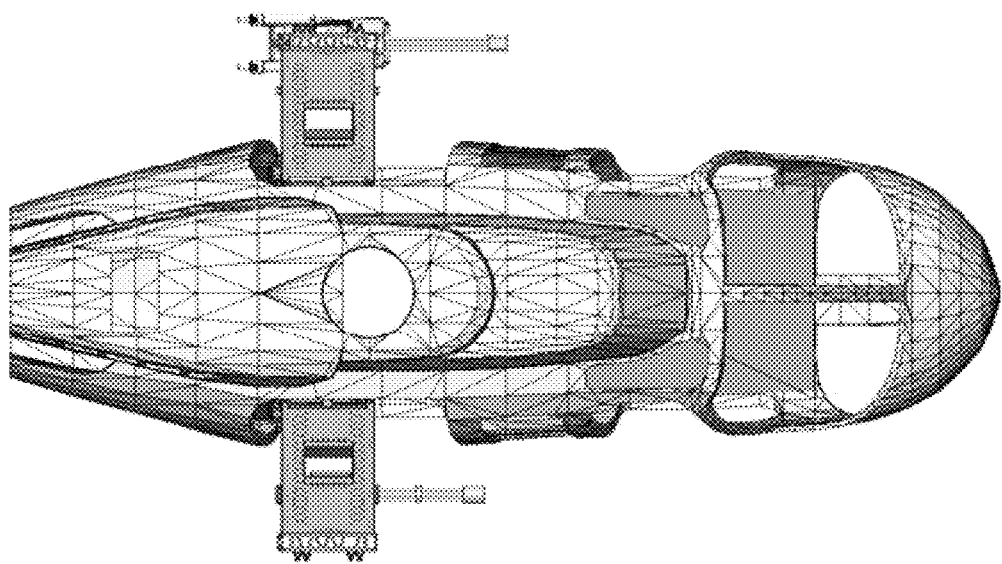

FIG. 15 depicts an embodiment including respective first and second support pylons. Each support pylon is shown including a gatling gun mounted thereto. Neither of the two support pylons of the depicted configuration include a pylon extension or ejector rack mounted to the support pylon.

Figure 16:
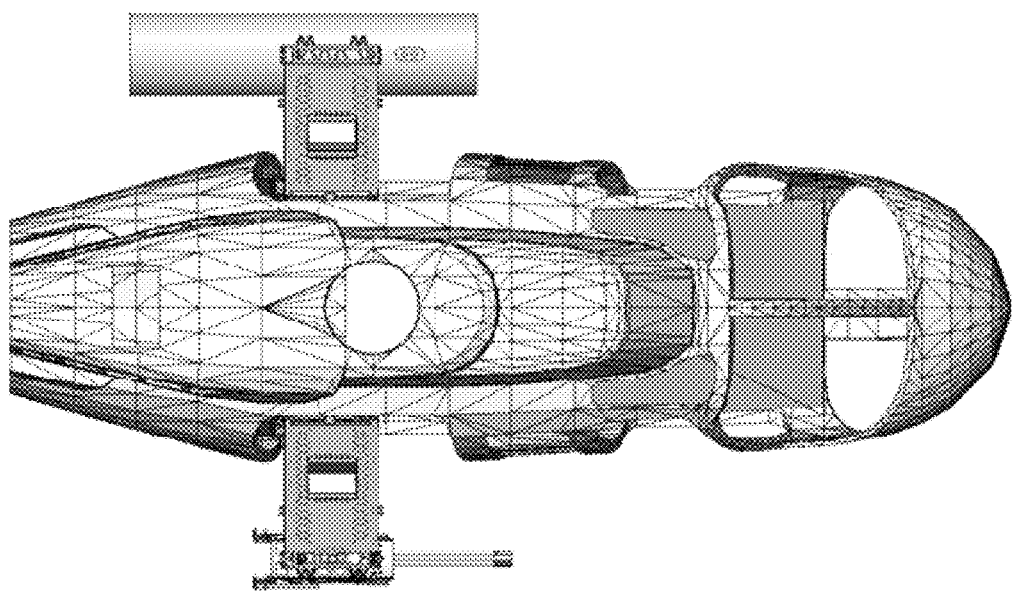

FIG. 16 depicts a configuration including respective first and second support pylons. A first support pylon includes a rocket pod mounted to it. A second support pylon includes a gatling gun mounted to it. Neither support pylon includes a pylon extension mounted to the support pylon.

Figure 17:
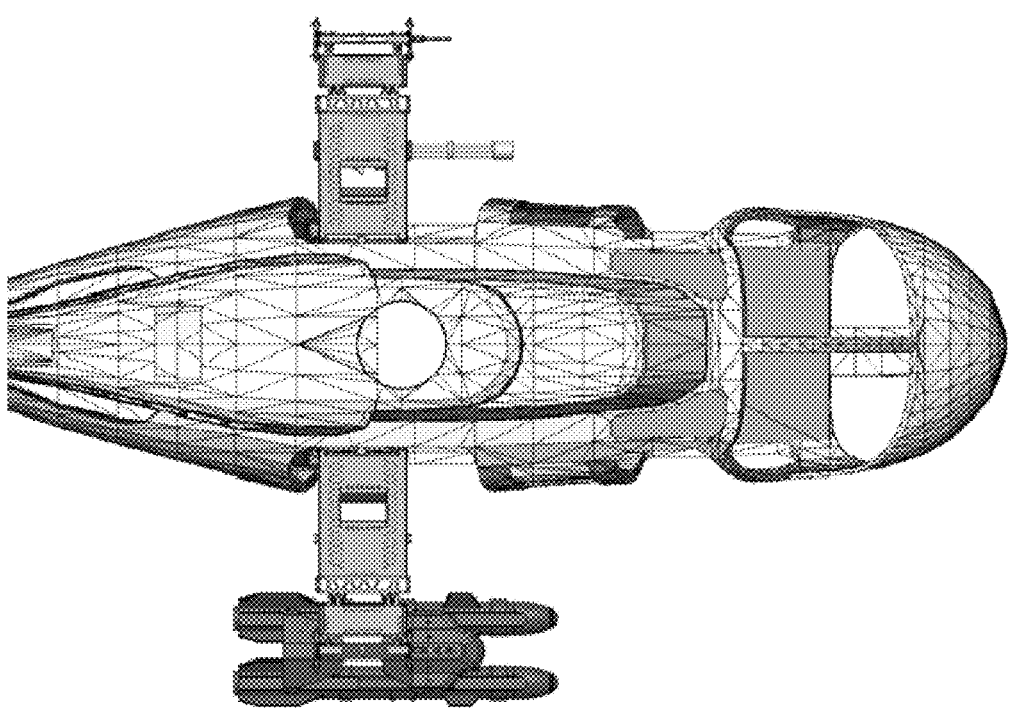

FIG. 17 depicts a configuration including respective first and second support pylons. Each support pylon is shown including a pylon extension mounted thereto. A rocket pod is mounted to a first pylon extension. A gatling gun is mounted to the second support pylon.

Figure 18:
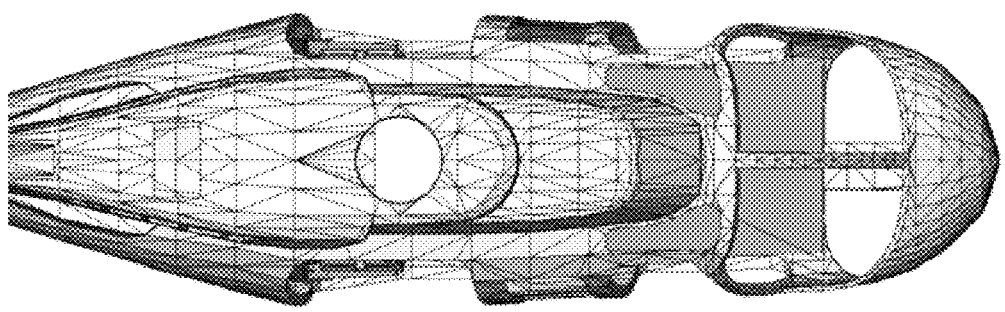

As shown in FIG. 18, in an embodiment, the first and second pylons may be removed from the mounting system. As shown, in an embodiment the first end of the center platform and the second end of the center platform may be disposed within the aircraft cabin. Such a configuration, in which the first and second ends of the center platform are disposed within the aircraft cabin, may allow the use and/or installation of original equipment doors of the aircraft without requiring removal of center platform. In an embodiment, the first and/or second ends of the center platform may extend at least partially through the first and/or second side opening of the aircraft cabin. In such a configuration, it may be possible to attach external load stores to the center platform without the use of a support pylon. In an embodiment, the center platform may extend outwardly from the aircraft to a first ejectable weapon station on one side, or both sides, of the aircraft. Other configurations may be utilized.

Various mounting system configurations may be implemented in addition/as an alternative to the configurations depicted in FIGS. 13-18.

A number of implementations have been described. Nevertheless, it will be understood that various modifications may be made. Accordingly, other implementations are within the scope of the following claims.

What is claimed is:

1. A mounting system comprising:
 a center platform including a plurality of mounting lugs for mounting the center platform transversely extending at least partially through an aircraft cabin with a first end of the center platform adjacent a first side opening of the aircraft cabin, and a second end of the center platform adjacent a second side opening of the aircraft cabin
 a first support pylon removably coupled to the first end of the center platform to extend outwardly from a first side of the aircraft;
 a second support pylon removably coupled to the second end of the center platform to extend outwardly form a second side of the aircraft;
 a modular floor component removably coupled relative to a longitudinal side of the center platform to provide a generally planar load surface including a top portion of the modular floor component and a top surface of the center platform;
 wherein each of the center platform and the modular floor are removably coupled to the aircraft; and
 wherein the central platform and the modular floor component are positioned above a floor of the aircraft cabin via one or more mounting structures within the aircraft.

2. The mounting system of claim 1, wherein the modular floor component is removably coupled relative to the longitudinal side of the center platform to provide a load surface extending along a longitudinal axis of the aircraft.

3. The mounting system of claim 1, further comprising:
 at least one cargo track disposed on the center platform; and
 at least one cargo track disposed on the modular floor component;

wherein the at least one cargo track disposed on the center platform and the at least one cargo track disposed on the module floor component are longitudinally aligned when the modular floor component is removably coupled relative to the longitudinal side of the center platform to provide a generally continuous cargo track extending along at least a portion of the load surface.

4. The mounting system of claim 3, further comprising a cargo cradle slidably movable along the generally continuous cargo track for slidably positioning the load cradle relative to the load surface.

5. The mounting system of claim 1, wherein the first end of the center platform and the second end of the center platform are disposed within the aircraft cabin.

6. The mounting system of claim 1, wherein the first end of the center platform extends at least partially through the first side opening of the aircraft cabin, and the second end of the center platform extends at least partially through the second side opening of the aircraft cabin.

7. The mounting system of claim 1, further comprising an inter-crew communication system port associated with one of the first support pylon and the second support pylon, the inter-crew communication system port coupled to an aircraft inter-crew communication system for coupling an external communication device with the aircraft inter-crew communication system.

8. The mounting system of claim 1, further comprising a data port associated with one of the first support pylon and the second support pylon, the data port coupled to an aircraft electronics system for coupling an external computing device with the aircraft electronics system.

9. The mounting system of claim 1, wherein each of the first support pylon and the second support pylon include a payload mount.

10. The mounting system of claim 9, wherein the payload mount includes an ejector rack.

11. The mounting system of claim 1, wherein the center platform, the first support pylon, and the second support pylon include formed metal structures.

12. A mounting system comprising:
a center platform including a plurality of mounting lugs for mounting the center platform transversely extending at least partially through an aircraft cabin with a first end of the center platform adjacent a first side opening of the aircraft cabin, and a second end of the center platform adjacent a second side opening of the aircraft cabin;
a first support pylon removably coupleable to the first end of the center platform to extend outwardly from a first side of the aircraft;
a second support pylon removably coupleable to the second end of the center platform to extend outwardly form a second side of the aircraft;
an inter-crew communication system port associated with and located on one of the first support pylon and the second support pylon, the inter-crew communication system port coupled to an aircraft inter-crew communication system for coupling an external communication device associated with a ground crew, with the aircraft inter-crew communication system; and
a data port associated with one of the first support pylon and the second support pylon, the data port coupled to an aircraft electronics system for coupling an external computing device with the aircraft electronics system.

13. The mounting system of claim 12, further comprising a modular floor component removably coupleable relative to a longitudinal side of the center platform to provide a generally planar load surface including a top portion of the modular floor component and a top surface of the center platform.

14. The mounting system of claim 13, wherein the modular floor component is removably coupleable relative to the longitudinal side of the center platform to provide a load surf ace extending along a longitudinal axis of the aircraft.

15. The mounting system of claim 13, further comprising:
at least one cargo track disposed on the center platform; and
at least one cargo track disposed on the modular floor component;
wherein the at least one cargo track disposed on the center platform and the at least one cargo track disposed on the module floor component are longitudinally aligned when the modular floor component is removably coupled relative to the longitudinal side of the center platform to provide a generally continuous cargo track extending along at least a portion of the load surface.

16. The mounting system of claim 15, further comprising a cargo cradle slidably movable along the generally continuous cargo track for slidably positioning the load cradle relative to the load surface.

17. The mounting system of claim 12, wherein the first end of the center platform and the second end of the center platform are disposed within the aircraft cabin.

18. The mounting system of claim 12, wherein the first end of the center platform extends at least partially through the first side opening of the aircraft cabin, and the second end of the center platform extends at least partially through the second side opening of the aircraft cabin.

19. The mounting system of claim 12, wherein each of the first support pylon and the second support pylon include a payload mount.

20. The mounting system of claim 19, wherein the payload mount includes an ejector rack.

21. The mounting system of claim 12, wherein the center platform, the first support pylon, and the second support pylon include formed metal structures.

* * * * *